United States Patent
Wang et al.

(10) Patent No.: US 9,491,732 B2
(45) Date of Patent: Nov. 8, 2016

(54) PAGING PROCESSING METHOD, USER EQUIPMENT AND SYSTEM

(71) Applicant: Huawei Technologies Co., LTD, Shenzhen (CN)

(72) Inventors: Ningshen Wang, Shenzhen (CN); Lin Shu, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 14/155,942

(22) Filed: Jan. 15, 2014

(65) Prior Publication Data

US 2014/0128110 A1   May 8, 2014

Related U.S. Application Data

(63) Continuation of application No. PCT/CN2011/077180, filed on Jul. 15, 2011.

(51) Int. Cl.
*H04W 68/00* (2009.01)
*H04W 64/00* (2009.01)
*H04W 60/04* (2009.01)

(52) U.S. Cl.
CPC ............. *H04W 64/00* (2013.01); *H04W 60/04* (2013.01); *H04W 68/00* (2013.01)

(58) Field of Classification Search
CPC .................................................... H04W 64/00
See application file for complete search history.

(56) References Cited

U.S. PATENT DOCUMENTS

| | | | | |
|---|---|---|---|---|
| 2004/0102199 | A1* | 5/2004 | Haumont | H04W 68/12 455/458 |
| 2012/0115454 | A1* | 5/2012 | Liao | H04W 60/02 455/418 |
| 2012/0275401 | A1* | 11/2012 | Sun | H04W 72/04 370/329 |
| 2012/0282941 | A1 | 11/2012 | Lu et al. | |

FOREIGN PATENT DOCUMENTS

| | | |
|---|---|---|
| CN | 101296479 A | 10/2008 |
| CN | 101360331 A | 2/2009 |
| CN | 101448320 A | 6/2009 |
| CN | 101500223 A | 8/2009 |
| CN | 101505474 A | 8/2009 |
| CN | 101969634 A | 2/2011 |
| CN | 102026143 A | 4/2011 |
| EP | 2187681 A1 | 5/2010 |
| EP | 2278755 A1 | 1/2011 |

(Continued)

OTHER PUBLICATIONS

3GPP TS 23.401 V10.3 Published Mar. 2011 herein referred to as 3GPP.*

(Continued)

*Primary Examiner* — Justin Lee
(74) *Attorney, Agent, or Firm* — Slater Matsil, LLP

(57) ABSTRACT

The present invention relates to a paging processing method, user equipment and system. A user equipment receives a paging message sent by a mobility management network element. The user equipment sentence a message for location update according to a value of a temporary identity (TIN) used for next update. A mobility management network element receives the message for location update and acquires a bearer context of the user equipment.

12 Claims, 7 Drawing Sheets

(56) References Cited

FOREIGN PATENT DOCUMENTS

| EP | 2472950 A1 | 7/2012 |
|----|------------|--------|
| EP | 2515560 A1 | 10/2012 |
| WO | 2011022896 A1 | 3/2011 |

OTHER PUBLICATIONS

"Correction to MM back-off timer" 3GPP TSG SA WG2 Meeting #83 Published Feb. 2011 by China Mobile.*
3rd Generation Partnership Project; Technical Specification Group Services and System Aspects; General Packet Radio Service (GPRS); Service description; Stage 2 (Release 10), 3GPP TS 23.060 V10.4.0, Jun. 2011, 321 pages.
3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401 V10.4.0, Jun. 2011, 281 pages.
3rd Generation Partnership Project; Technical Specification Group Core Network and Terminals; Non-Access Stratum (NAS) protocol for Evolved Packet System (EPS); Stage 3 (Release 10), 3GPP TS 24.301, V10.3.0, Jun. 2011, 253 pages.
International Search Report and Written Opinion received in Application No. PCT/CN2011/077180 mailed Feb. 27, 2012, 9 pages.

* cited by examiner

PAGING PROCESSING METHOD, USER EQUIPMENT AND SYSTEM

This application is a continuation of International Application No. PCT/CN2011/077180, filed on Jul. 15, 2011, which is hereby incorporated by reference in its entirety.

TECHNICAL FIELD

The present invention relates to the field of communications technologies, and in particular, to a paging processing method, user equipment and system.

BACKGROUND

In an evolution process of a network from a 2G/3G network to an LTE (long term evolution) network, and in a certain period, there is a scenario where the 2G/3G network and the LTE network coexist. In a handover position between the 2G/3G network and the LTE network, when a UE (user equipment) is moved from the 2G/3G network to the LTE network, the UE may initiate a TAU (tracking area update) procedure; when the UE is moved from the 2G/3G network to the LTE network, the UE may initiate a RAU (routing area update) procedure. In order to reduce TAU or RAU caused by the UE in an Idle state due to the change of a RAT (radio access type), an ISR (Idle mode signaling reduction, idle mode signaling reduction) mechanism is introduced. At present, the ISR mechanism between 3GPP (the 3rd generation partnership project) access networks is a double registration mechanism, that is, the UE is registered in two different access networks. In the condition that the ISR mechanism is activated, when the UE is moved from an MME (mobility management entity) to an SGSN (serving GPRS support node), UE context on the MME is not deleted. Correspondingly, when the UE is moved from the SGSN to the MME, UE context on the SGSN is not deleted either.

In the scenario where the 2G/3G network and the LTE network coexist, when an SGW (serving gateway) receives downlink data or signaling, if the ISR mechanism is activated, the SGW sends a DDN (downlink data notification) message to the MME and the SGSN, and the SGSN and the MME may page the UE at the same time.

If the UE camps on the LTE network, the network side may set up a corresponding bearer according to context of the UE saved on the MME. If the UE camps on the 2G/3G network, the network side may set up a corresponding bearer according to context of the UE saved on the SGSN.

The prior art has at least the following problem. In the state that the ISR mechanism is activated and the radio access type of the UE is changed, paging the UE by the network side may lead to a loss of a part of bearers or setup of a bearer with inconsistent bearer contexts at two ends, thereby seriously affecting normal use of a service, and bringing bad user experience.

SUMMARY OF THE INVENTION

Embodiments of the present invention provide a paging processing method, user equipment and system, so as to solve a problem of a loss of a part of bearers or setup of a bearer with inconsistent bearer contexts at two ends that may be caused by paging a UE by a network side, in the state that an ISR mechanism is activated and a radio access type of the UE is changed.

An embodiment of the present invention provides a paging processing method. A user equipment receives a paging message sent by a mobility management network element. The user equipment sentence a message for location update according to a value of a temporary identity (TIN) used for next update. The mobility management network element receives the message for location update and acquires a bearer context of the user equipment.

An embodiment of the present invention further provides a user equipment. A receiving module is configured to receive a paging message sent by a mobility management network element. A sending module is configured to, after the paging message sent by the mobility management network element is received, send a message for location update to the mobility management network element according to a value of a TIN, so that the mobility management network element acquires a bearer context of the user equipment.

An embodiment of the present invention further provides a paging processing system, which includes a mobility management network element and a user equipment. The mobility management network element is configured to send a paging message to the user equipment and, after receiving a message for location update sent by the user equipment, to acquire a bearer context of the user equipment. The user equipment is configured to receive the paging message sent by the mobility management network element and to send the message for location update to the mobility management network element according to a value of a TIN.

In embodiments of the present invention, after receiving the paging message sent by the network side, the user equipment sends the message for location update after determining the value of the TIN of the user equipment, and after receiving the message for location update, the mobility management network element acquires the bearer context of the user equipment, so that the bearer context on the mobility management network element on the network side and the bearer context on the user equipment may keep consistent, thereby further overcoming a problem of a loss of a part of bearers or setup of a bearer with inconsistent bearer contexts at two ends in a paging process, ensuring normal use of a service, and improving user experience.

BRIEF DESCRIPTION OF THE DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiment of the present invention. Apparently, the embodiments to be described are merely a part rather than all of the embodiment of the present invention. All other embodiments obtained by a person skilled in the art based on the embodiments of the present invention without creative efforts shall fall within the protection scope of the present invention.

A GSM (global system of mobile communication)/UMTS (universal mobile telecommunications system) is a mobile communication network defined by a 3GPP organization, and the communication network is widely deployed and applied currently.

The mobile communication network mainly includes two parts: a radio access network (RAN) and a core network (CN). The CN may be divided into a circuit switched domain (CS domain) and a packet switched domain (PS domain) logically. The CS domain mainly processes a voice service, and the PS domain mainly processes a packet service.

A signaling plane control entity of the PS domain is an SGSN (serving GPRS support node). The SGSN is connected to a BSC (base station controller) through a Gb interface, and is connected to an RNC (radio network controller) through an Iu interface, and serves a data service of a GPRS (general packet radio service)/UMTS. It is usually called a GPRS service when the UE accesses the SGSN through the Gb interface of the BSC and completes a PS service; and it is usually called a UMTS service when the UE accesses the SGSN through the Iu interface of the RNC and completes the PS service.

To cope with the challenge of a radio broad-band technology and keep the leading edge of a 3GPP network, a 3GPP organization makes a long term evolution (LTE) plan. Under the guidance of the evolution plan, architecture of a new mobile communication network is defined. The architecture is more flat than the existing GPRS/UMTS architecture, and only a packet domain is kept, and therefore it may be called an evolved packet network (EPS).

Figure 1:
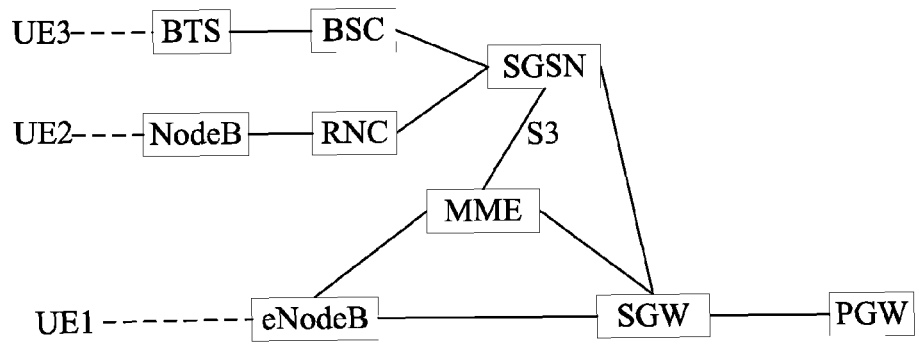
FIG. 1 is an architecture diagram of a current radio evolution network.

In the process of evolving a network from a 2G/3G network to an LTE network, and in a certain period, there is a scenario where the 2G/3G network and the LTE network coexist. FIG. 1 is an architecture diagram of a current radio evolution network.

As shown in FIG. 1, a BTS (base transceiver station) and a BSC form a radio access part of a 2G network, which is referred to as a GERAN (GSM/EDGE radio access network).

A NodeB and an RNC form a radio access part of a 3G network, which is referred to as a UTRAN (UTMS Terrestrial Radio Access Network, UMTS terrestrial radio access network).

An LTE network is formed by an eNodeB (evolved NodeB, evolved nodeB), an MME, an SGW (serving gateway) and a PGW (PDN Gateway or packet data network gateway). The eNodeB forms a radio access part of the LTE network, and is referred to as an E-UTRAN (evolved UMTS terrestrial radio access network). Main functions of the eNodeB include implementation of a radio resource management function, IP header compression and user data stream encryption; MME selection when the UE is attached, scheduling and transmission of paging information; scheduling and transmission of broadcast information, setting and providing measurement of the eNodeB and so on.

The core network in the architecture diagram of the radio evolution network shown in FIG. 1 mainly includes the following network elements: the SGSN, the MME, the SGW and the PGW. The SGSN supports a GTPv2 (GPRS tunnelling protocol version 2), is a mobility management network element of the 2G/3G network, and implements a function such as management on the user context of a 2G/3G network user. The MME is a mobility management entity, is responsible for functions such as encryption, roaming, and tracking of NAS (non-access-stratum) signaling and NAS signaling, user temporary identity identifier allocation, and a security function. The MME is corresponding to a control plane part of the SGSN inside a current UMTS system. The SGW is responsible for a local mobility anchor point, a mobility anchor point inside a 3GPP system, and lawful interception of related information. The PGW is responsible for related functions such as strategy execution, charging, and lawful interception.

The user equipment may access various networks under the architecture, for example, a UE1 accesses the LTE network, a UE2 accesses the 3G network, and a UE3 accesses the 2G network. An S3 interface between the SGSN and the MME is configured to: when the user equipment is moved between the 2G/3G network and the LTE network, perform a function such as user context sending.

Figure 2:
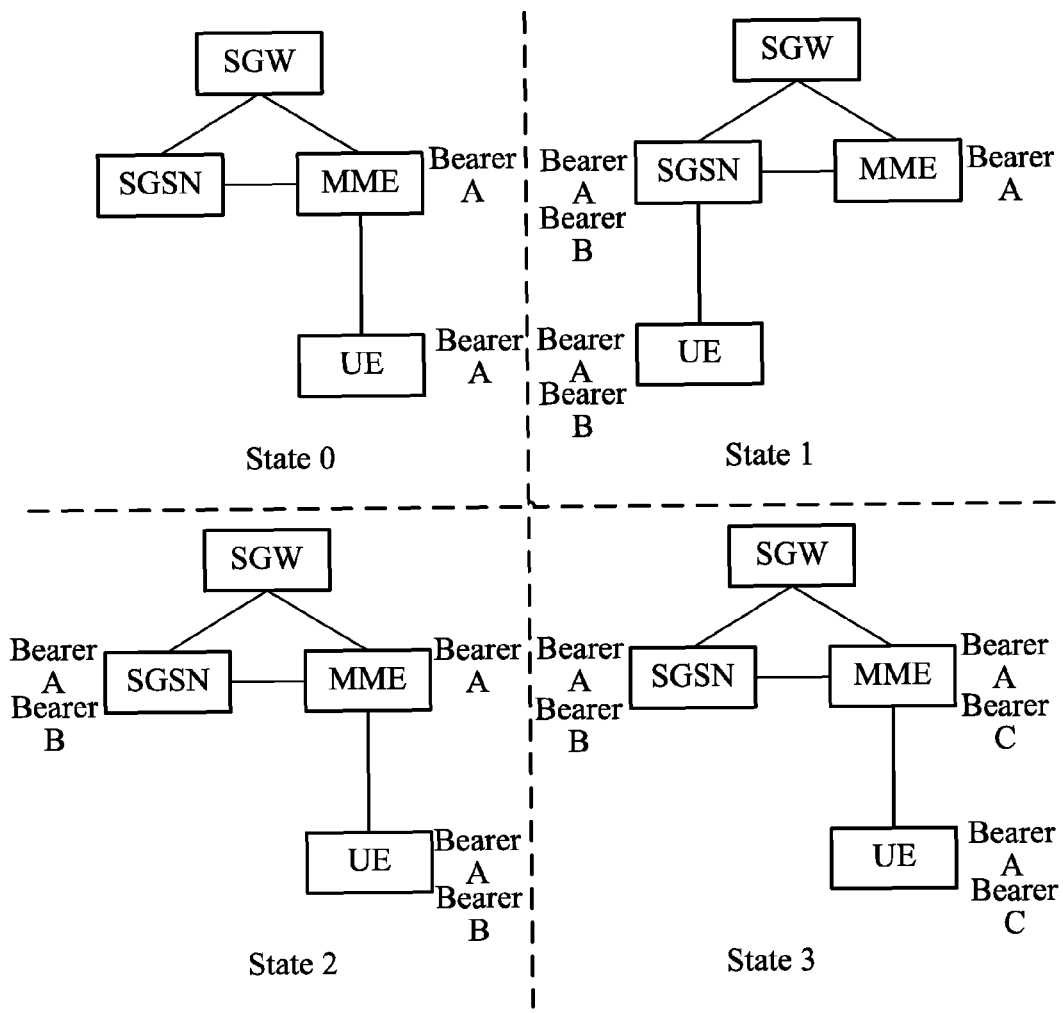
FIG. 2 is a first state diagram provided by an embodiment of the present invention.

In the radio evolution network architecture, as shown in FIG. 2, the MME and the SGSN each are connected to the SGW, and the MME is connected to the SGSN.

First, it is assumed that at an initial state, the UE access the MME and sets up bearer A, and activates an ISR mechanism.

As a state 0 shown in FIG. 2, in this case, the UE is on an MME side. The UE keeps context information of bearer A. The MME keeps the context information of bearer A.

Second, the UE is moved from the LTE network to the 2G/3G network, the SGSN obtains the latest context information (including the context information of bearer A) of the UE from the MME side, and the UE further sets up bearer B on the SGSN side. In this case, in order to initiate a TAU procedure after a radio access type is switched subsequently, and keep consistency between the context information of the UE on the SGSN and the context information of the UE on the MME, the value of a local TIN of the UE may be set as a P-TMSI.

As a state 1 shown in FIG. 2, in this case, the UE is on the SGSN side. The UE keeps the context information of bearer A and that of bearer B. The MME keeps the context information of bearer A. The SGSN keeps the context information of bearer A and that of bearer B.

Third, the UE is moved from the 2G/3G network to the LTE network. Because a local ISR mechanism of the UE is deactivated, the UE sends a TAU message to the MME to synchronize the context information. If the MME is under an overload state at this time, the MME rejects the TAU procedure, the MME may send a TAU Reject message to the UE, and carry a value of a mobility management back-off timer in the TAU Reject message. After receiving the value of the mobility management back-off timer, the UE starts a local mobility management back-off timer of the UE, and during a running period of the local mobility management back-off timer, the UE does not initiate the TAU procedure for the moment.

The processing manner when the MME is overloaded is a NAS layer congestion processing mechanism. When the MME is overloaded, the MME may reject an MM (mobility management) request message sent by the UE. When a NAS request message (for example, a TAU message) is rejected, the MME may send a value of the mobility management back-off timer to the UE, and the UE may start a local mobility management back-off timer. During the running period of the mobility management back-off timer, the UE does not initiate any NAS requests (except serving a user, except emergency service and called-related service), thereby reducing impact caused on the network by the UE in the condition that the network is overloaded.

As a state 2 shown in FIG. 2, in this case, the UE is on the MME side. The UE keeps the context information of bearer A and that of bearer B. The MME keeps the context information of bearer A. The SGSN keeps the context information of bearer A and that of bearer B.

Similarly, before the UE is moved from the 2G/3G network to the LTE network, the UE initiates a RAU procedure to the SGSN. If the SGSN is under an overload state, the SGSN may reject the RAU message initiated by the UE. The RAU Reject message sent by the SGSN to the UE includes the value of the mobility management back-off timer, and after receiving it, the UE starts the local mobility management back-off timer, and does not send a NAS message (except serving a user, except emergency service and called-related service) during the running period of the mobility management back-off timer. During the running period of the mobility management back-off timer, the UE is moved from the 2G/3G network to the LTE network. Because the mobility management back-off timer is irrelevant to a RAT in a current protocol, after the UE is moved to the LTE network, the local mobility management back-off timer of the UE is still under a running state. Because the value of a TIN on the UE is set as the P-TMSI in this case, the UE needs to initiate the TAU procedure. However, because the local mobility management back-off timer of the UE is still under the running state, the UE does not initiate the TAU procedure for the moment. This scenario may also lead to inconsistency between the bearer context kept by the MME and the bearer context kept by the SGSN.

A person of ordinary skill in the art may understand that, under other circumstances, inconsistency between the bearer context kept by the 2G/3G network and the bearer context kept by the LTE network may also be caused. For example, a scenario in which, in order to restrict access of a part of users, the network side may send, through a broadcast message, a table of types of equipments that are restricted from access, and when the equipments of these types are moved to a network to which the equipments are restricted from access, the equipments of these types do not actively initiate a TAU message, but may receive mobile terminating service.

Fourth, after the SGW receives a Create Bearer request message, because the UE is not under a connected state, the network side needs to page the UE, to make the UE be in the connected state, and then executes a new bearer setup procedure.

The SGW sends a DDN message to the MME and the SGSN, leading to that the SGSN and the MME page the UE at the same time. In this case, the UE is on the MME side, and after the UE receives the paging message sent by the MME, the UE sends a service request message to the MME.

After the MME receives the Service request message, the MME sends an Initial Context Setup Request (initial context setup request) message to the eNodeB, where the message carries bearer information on the MME. Generally, the bearer information includes a Bearer ID (bearer identity) and so on. If there are multiple bearers, the carried message may include a bearer information list, where the list includes information of each bearer. At this time, the bearer information on the MME only includes the Bearer ID of bearer A.

The eNodeB notifies the UE of information such as the received Bearer ID to set up a radio access bearer. If the Bearer ID which is notified by the eNodeB to the UE does not exist in the UE, setup of the radio access bearer corresponding to the Bearer ID fails. If the local Bearer ID of the UE is not included in the Bearer ID list of radio access bearers which the eNodeB requests the UE to set up, the UE may locally delete a bearer context corresponding to the Bearer ID. Because the Bearer ID of local bearer B of the UE is not included in the Bearer ID list of radio access bearers which the eNodeB requests the UE to set up, the UE may locally delete the context information of bearer B.

After the radio access bearer between the UE and the eNodeB is set up, the eNodeB sends an initial context setup response message to the MME, the MME sends a Modify Bearer Request message to the SGW, and the SGW sends a Modify Bearer Response message to the MME. After the SGW receives the Modify Bearer Request message sent by the MME, the SGW may obtain that the UE camps on the MME side, and the SGW sends a Stop Paging message to the SGSN, so as to stop the SGSN from paging the UE again.

Until then the whole paging process is completed, and the UE is under the connected state. After the paging process is completed, a procedure of setting up a new bearer is executed, where the bearer that is newly set up is bearer C.

A person of ordinary skill in the art may understand that, other conditions may lead to that the network side initiates paging to the UE, for example, receiving a modify bearer request, receiving a downlink data packet and so on.

As a state 3 shown in FIG. 2, in this case, the UE is on an MME side. The UE keeps the context information of bearer A and bearer C. The MME keeps the context information of bearer A and bearer C. The SGSN keeps the context information of bearer A and that of bearer B.

It can be seen that, the context information of bearer B on the UE is lost.

It can be predicted that, when the mobility management back-off timer on the UE expires, the UE initiates the TAU procedure to the MME, the MME requests latest context information from the SGSN, and the context information on the MME is updated as the context information of bearer A and that of bearer B.

Later, because the UE performs other services, the UE initiates a Service Request procedure, the MME may delete the context information of bearer B which the UE does not have, and the UE may delete the context information of bearer C which the MME does not have, thereby leading to that the UE and the MME both have the context information of bearer A only.

In the foregoing process, in the fourth step, when the network side pages the UE, the MME does not acquire the bearer context from the SGSN, which leads to inconsistency between the bearer context on the UE and the bearer context on the MME, and results in a loss of a part of bearers, thereby seriously affecting normal use of a service, and bringing bad user experience.

A person of ordinary skill in the art may understand that, assuming that in the second step, the UE does not set up a new bearer B on the SGSN side, but modifies the context information of bearer A. After the UE returns to the MME side, or is possibly in the paging process, because the context information of bearer A on the MME and the context information of bearer A on the UE is inconsistent, the bearer contexts of two ends of bearer A that is set up are inconsistent, which results in disorder on the service on bearer A (for example, a service quality problem or a data packet filtering problem occurs).

A person of ordinary skill in the art may understand that, assuming that in the condition that initially the UE accesses the SGSN and activates an ISR mechanism, and after network handover and the change of the bearer context, and possibly when the network side pages the UE, the SGSN does not acquire the bearer context from the MME, thereby leading to inconsistency between the bearer context on the UE and the bearer context on the SGSN, and resulting a problem of a loss of a part of bearers or setup of a bearer with inconsistent bearer contexts at two ends.

A person of ordinary skill in the art may understand that, the current radio evolution network architecture includes the LTE network and the 2G/3G network, and with the development of the network architecture, a scenario where more networks coexist may emerge, the UE may switch between the mobility management network elements of three kinds or more. When the network side pages the UE, a problem of a loss of a part of bearers or setup of a bearer with inconsistent bearer contexts at two ends may also occur.

Figure 3:
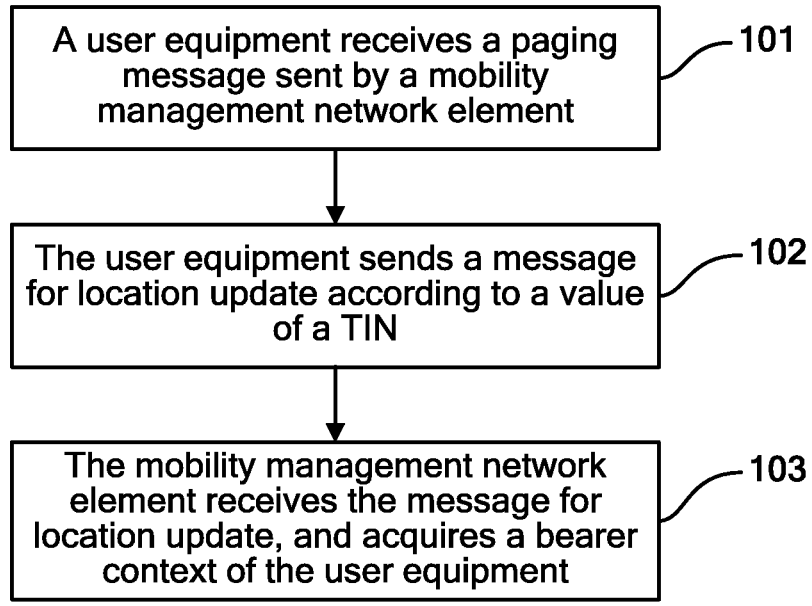
FIG. 3 is a schematic flow chart of a first method provided by an embodiment of the present invention.

In order to solve the foregoing problems, as shown in FIG. 3, an embodiment of the present invention provides a paging processing method. In step 101 a user equipment receives a paging message sent by a mobility management network element. In step 102 the user equipment sends a message for location update according to a value of a TIN. In step 103 the mobility management network element receives the message for location update, and acquires a bearer context of the user equipment.

The value of the TIN may be a P-TMSI (packet temporary mobile subscriber identity), a GUTI (globally unique temporary identity) or a RAT-Related TMSI (radio access type related temporary mobile subscriber identity).

The value of the TIN being the P-TMSI indicates that the bearer context is changed when the user equipment is on an SGSN side. The value of the TIN being the GUTI indicates that the bearer context is changed when the user equipment is on an MME side. The value of the TIN being the RAT-Related TMSI indicates that the bearer context of the user equipment is not changed.

It can be seen that, the value of the TIN reflects the change of the bearer context of the user equipment. For example, after the user equipment sets up a bearer on the SGSN side, the value of the TIN of the user equipment is set as the P-TMSI, which indicates that the bearer context of the user equipment is changed on the SGSN side. After the user equipment is moved to the MME side, the TAU procedure is initiated, and after the MME acquires the bearer context from the SGSN, the value of the TIN of the user equipment may be set as the RAT-Related TMSI, which indicates that the bearer context on the MME, the bearer context on the SGSN, and the bearer context on the UE are consistent currently, and none is changed.

A person of ordinary skill in the art may understand that, with the development of a technology, the TIN may further have other values, which may be used to indicate the change of the bearer context at different network sides.

The user equipment sends a message for location update according to the value of the TIN, after receiving the message for location update, the mobility management network element may acquire the bearer context, that is, the user equipment may learn the network side where the bearer context is changed by determining the value of the TIN. By sending the message for location update to the mobility management network element of the network side where the current user equipment is located, the mobility management network element may acquire the bearer context from the mobility management network element on the network side where the bearer context is changed.

When the user equipment sends the message for location update according to the value of the TIN, and after the mobility management network element on the network side where the user equipment is located acquires the bearer context from the mobility management network element on the network side where the bearer context is changed, the bearer context of the user equipment and the bearer context on the mobility management network element on the network side where the user equipment is located keep consistent. Therefore, in a paging process, no bearer is lost, thereby ensuring normal use of a service, and improving user experience.

A person of ordinary skill in the art may understand that, in the current radio network evolution architecture, when the value of the TIN is the RAT-Related TMSI, the user equipment does not need to send the message for location update, and the user equipment may directly initiate a Service Request procedure.

A person of ordinary skill in the art may understand that, in the current radio network evolution architecture, sending the message for location update according to the value of the TIN has two conditions, which are illustrated below.

A first condition will be described now.

Figure 4:
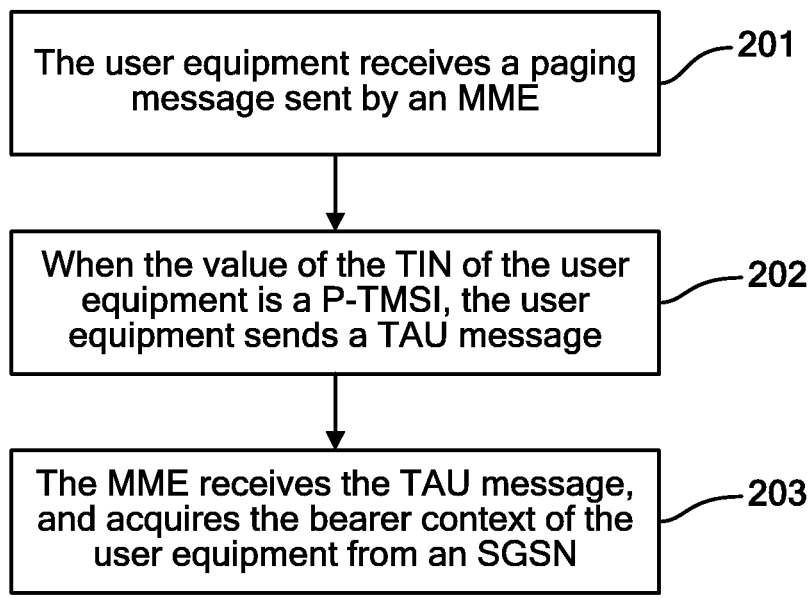
FIG. 4 is a schematic flow chart of a second method provided by an embodiment of the present invention.

Assuming that the user equipment is on the MME side, as shown in FIG. 4, the method provided by the embodiment of the present invention may include the following steps. In step 201, the user equipment receives the paging message sent by the MME. In step 202, when the value of the TIN of the user equipment is the P-TMSI, the user equipment sends a TAU message. In step 203, the MME receives the TAU message and acquires the bearer context of the user equipment from the SGSN.

After the user equipment receives the paging message sent by the MME, by determining that the value of the TIN is the P-TMSI, it learns that the bearer context is changed on the SGSN side. The user equipment needs to send the message for location update, and therefore, the user equipment sends the TAU message. The TAU message is one kind of messages for location update, and after receiving the TAU message, the MME may acquire the bearer context of the user equipment from the SGSN.

Generally, in the paging process, after sending the TAU message, the user equipment does not send a Service Request again.

In order to illustrate the technical effect of the method provided by the embodiment of the present invention, illustration is provided in the following with reference to FIG. 5.

Figure 5:
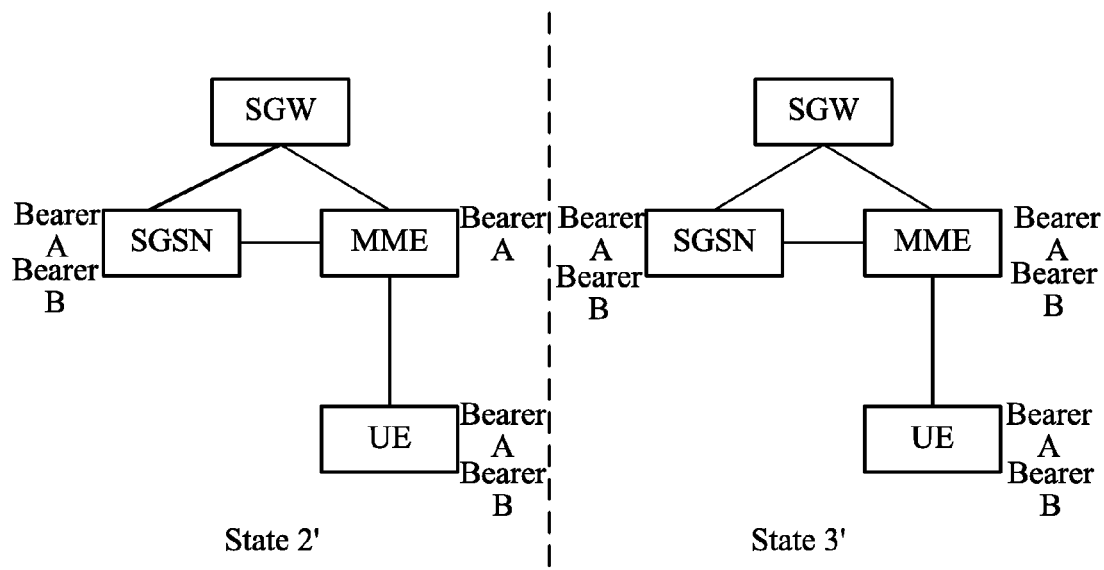
FIG. 5 is a second state diagram provided by an embodiment of the present invention.

FIG. 5 is a state diagram obtained after the method provided by the embodiment of the present invention is applied when a UE is on an MME side. In order to illustrate the technical effect of the embodiment of the present invention, FIG. 5 only shows a state 2' before paging and a state 3' after paging.

The state 2' in FIG. 5 is similar to the state 2 in FIG. 2. In this case, the UE is on the MME side, and a mobility management back-off timer on the UE is under a running state. The UE keeps the context information of bearer A and that of bearer B. The MME keeps the context information of bearer A. The SGSN keeps the context information of bearer A and that of bearer B.

At this time, the network side initiates paging, after the UE receives the paging request sent by the MME, the UE determines that the value of the TIN of the UE is the P-TMSI, and then sends the TAU message. After receiving the TAU message, the MME acquires the bearer context from the SGSN.

As a state 3' shown in FIG. 5, in this case, the UE is on an MME side. The UE keeps the context information of bearer A and that of bearer B. The MME keeps the context information of bearer A and that of bearer B. The SGSN keeps the context information of bearer A and that of bearer B.

It can be seen that, after using the method provided by the embodiment of the present invention, the UE learns, by determining that the value of the TIN of the UE is the P-TMSI, that the bearer context is changed on the SGSN side, and therefore, the UE sends the TAU message. After the MME receives the TAU message, the MME acquires the bearer context from the SGSN. Because the bearer context on the MME and the bearer context on the UE are consistent, the context information of bearer B on the UE is not deleted in the process that the MME pages the UE, that is, bearer B is not lost, thereby ensuring normal use of a service, and improving user experience.

Further, in one example of step 202, the user equipment sends the TAU message when the mobility management back-off timer of the user equipment is under the running state and the value of the TIN of the user equipment is the P-TMSI.

The mobility management back-off timer being under the running state indicates that the user equipment does not actively send the TAU message.

Figure 6:
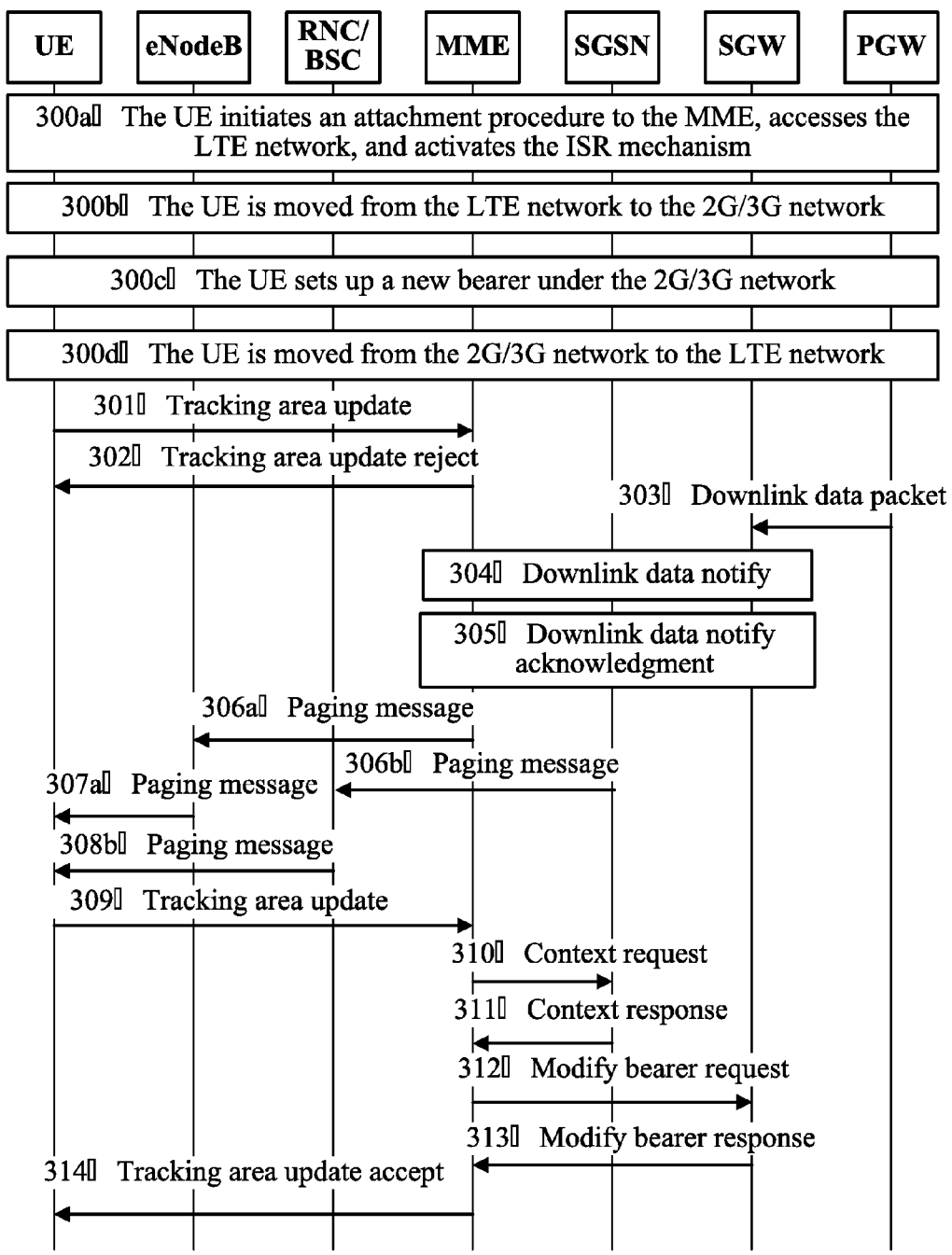
FIG. 6 is a schematic flow chart of a third method provided by an embodiment of the present invention.

In a specific scenario below, the method provided by the embodiment of the present invention is further illustrated with examples. As shown in FIG. 6, FIG. 6 describes a scenario where the UE initially camps on the MME side and activates an ISR mechanism. In the scenario, the UE is moved from the LTE network to the 2G/3G network, and sets up a new bearer in the 2G/3G network. Afterwards, the UE is returned from the 2G/3G network to the LTE network, when the UE initiates a TAU procedure to the MME, the UE is rejected due to that the MME is overloaded, and the UE starts the mobility management back-off timer. During the running period of the timer, the UE cannot actively send the NAS message, but can accept a called-related service. When the UE receives the paging sent by the MME, the UE sends the TAU message after determining that the value of the TIN inside the UE is the P-TMSI. After the MME receives the TAU message, the MME acquires the bearer context of the UE from the SGSN. The specific process is as follows.

In step 300*a*, the UE initiates an attachment procedure to the MME, accesses the LTE network, and activates the ISR mechanism, that is the UE is on the MME side. In step 300*b*, UE is moved from the LTE network to the 2G/3G network, that is the UE is moved to the SGSN side. In step 300*c*: The UE sets up a new bearer under the 2G/3G network, the UE may set the TIN as the P-TMSI. In step 300*d*: The UE is moved from the 2G/3G network to the LTE network, that is the UE is moved to the MME side.

301: The UE sends a tracking area update (TAU) message to the MME.

Because the UE sets up a new bearer under the SGSN, after the UE is moved to the MME side, the UE needs to send the TAU message to the MME, so that the MME acquires the bearer context from the SGSN.

302: Because the MME is overloaded, the MME sends a tracking area update reject (TAU Reject) message to the UE.

The TAU Reject message includes the time of the mobility management back-off timer. After receiving the TAU Reject message including the time of the mobility management back-off timer sent by the MME, the UE starts the mobility management back-off timer of the UE, and in the condition that the timer does not expire, the UE does not actively send a NAS message (except serving a user, except emergency service and called-related service). In this case, inconsistency between the bearer context on the UE and the bearer context on the MME occurs.

303: After the PGW receives a downlink data packet sent to the UE, the PGW sends the downlink data packet to the SGW.

A person of ordinary skill in the art may understand that, other manners may also lead to that the network side initiates paging to the UE, for example, receiving a Create Bearer Request or receiving a modify bearer request.

304: The SGW sends a downlink data notify (DDN) message to each of the MME and the SGSN.

305: The MME and the SGSN each send a downlink data notify acknowledgment (DDN Ack) message to the SGW.

306*a*: The MME sends a paging message to the eNodeB.

306*b*: The SGSN sends a paging message to the RNC/BSC.

307*a*: The eNodeB sends the paging message to the UE.

308*b*: The RNC/BSC sends the paging message to the UE.

309: The UE sends a tracking area update message to the MME.

The UE is on the MME side at this time. After receiving the paging message sent by the eNodeB, the UE determines that the value of the TIN is the P-TMSI, and learns that the bearer context is changed on the SGSN side. Therefore, the UE sends the TAU message, and after the MME receives the TAU message, the MME acquires the bearer context from the SGSN.

Optionally, the UE may also determine whether the mobility management back-off timer is under the running state at the same time. When the mobility management back-off timer is under the running state and the value of the TIN is the P-TMSI, the UE sends the TAU message.

310: The MME sends a context request (Context request) message to the SGSN.

311: The SGSN sends a context response (Context Response) message to the MME.

A this time, the MME acquires the bearer context on the SGSN. In this case, the bearer context on the UE and the bearer context on the MME keep consistent.

312: The MME sends a modify bearer request (Modify Bearer request) message to the SGW.

313: The SGW sends a modify bearer response (Modify Bearer Response) message to the MME.

At this time, a radio bearer between the UE and the eNodeB is set up. Because the bearer context on the UE and the bearer context on the MME are consistent, in this process, a case that a part of bearers are lost does not occur.

314: The MME sends a tracking area update accept (TAU Accept) message to the UE.

After uplink and downlink channels get through, a downlink data packet can be sent from the SGW to the UE.

In the same way, if the paging is initiated according to a Create Bearer Request or a modify bearer request, after the TAU procedure ends and uplink and downlink channels (for example, a connection on a radio side) are set up, a Create Bearer Request procedure or a modify bearer request procedure is continued.

In this scenario, after receiving the paging sent by the MME, the UE learns, by determining that the value of the TIN of the UE is the P-TMSI, that the bearer context is changed on the SGSN side, and therefore, the UE sends the TAU message. After the MME receives the TAU message, the MME acquires the bearer context from the SGSN. Because the bearer context on the MME and the bearer context on the UE are consistent, in the paging process, a loss of a part of bears does not occur, thereby ensuring normal use of a service, and improving user experience.

A second condition will now be described.

Figure 7:
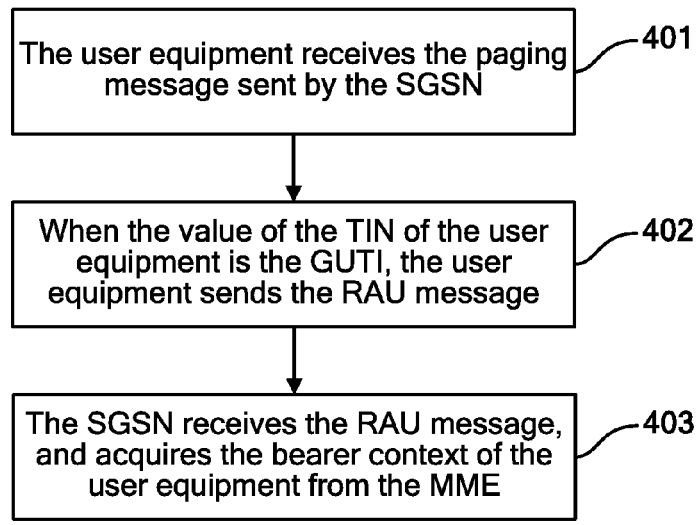
FIG. 7 is a schematic flow chart of a fourth method provided by an embodiment of the present invention.

Assuming that the user equipment is on the SGSN side, as shown in FIG. 7, the method provided by the embodiment of the present invention may specifically include the following steps.

401: The user equipment receives the paging message sent by the SGSN;

402: When the value of the TIN of the user equipment is the GUTI, the user equipment sends the RAU message; and

403: The SGSN receives the RAU message, and acquires the bearer context of the user equipment from the MME.

After the user equipment receives the paging message sent by the SGSN, the user equipment learns, by determining that the value of the TIN is the GUTI, that the bearer context is changed on the MME side, and the user equipment needs to send the message for location update, and therefore, the user equipment sends the RAU message. The RAU message is one kind of messages for location update, and after receiving the RAU message, the SGSN may acquire the bearer context from the MME.

Generally, in the paging process, after sending the RAU message, the user equipment does not send the Service Request again.

In order to illustrate the technical effect of the method provided by the embodiment of the present invention, illustration is provided in the following with reference to FIG. 8.

Figure 8:
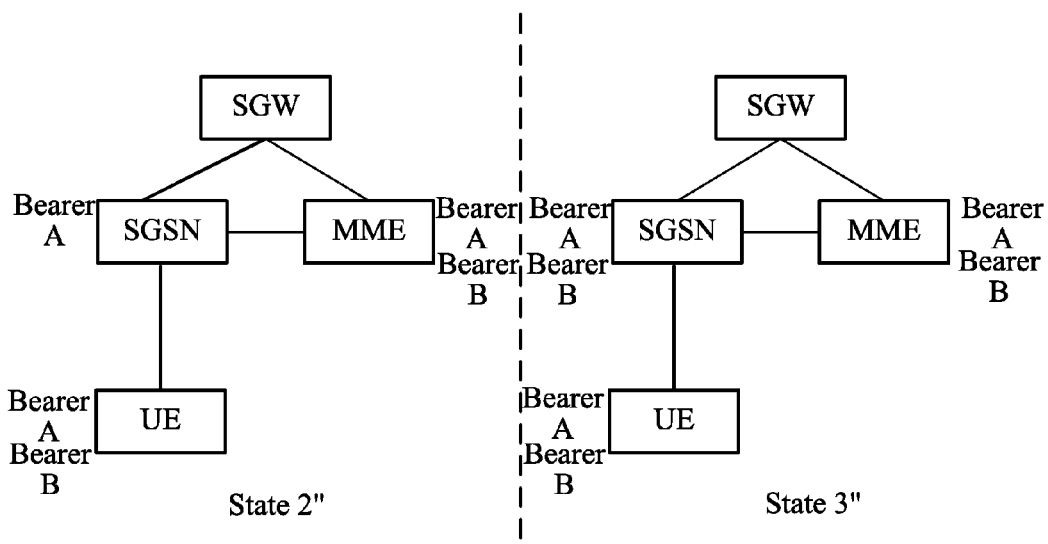
FIG. 8 is a third state diagram provided by an embodiment of the present invention.

FIG. 8 is a state diagram obtained after the method provided by the embodiment of the present invention is applied when a UE is on an SGSN side. In order to illustrate the technical effect of the embodiment of the present invention, FIG. 8 only shows a state 2" before paging and a state 3" after paging.

The state 2" in FIG. 8 is assumed as follows: the UE is on the SGSN side, and the mobility management back-off timer on the UE is under the running state. The UE keeps the context information of bearer A and that of bearer B. The MME keeps the context information of bearer A and that of bearer B. The SGSN keeps the context information of bearer A.

In this case, the network side initiates paging, after the UE receives the paging request sent by the SGSN, the UE determines that the value of the TIN of the UE is the GUIT, and sends a RAU message. After receiving the RAU message, the SGSN acquires the bearer context from the MME.

As a state 3" shown in FIG. 8, in this case, the UE is on the SGSN side. The UE keeps the context information of bearer A and that of bearer B. The MME keeps the context information of bearer A and that of bearer B. The SGSN keeps the context information of bearer A and that of bearer B.

It can be seen that, with the method provided by the embodiment of the present invention, the UE learns, by determining that the value of the TIN of the UE is the GUTI, obtains that the bearer context is changed on the MME side, and therefore, the UE sends the TAU message, and the SGSN acquires the bearer context of the user equipment from the MME. Because the bearer context on the SGSN and the bearer context on the UE are consistent, the context information of bearer B on the UE is not deleted in the process that the SGSN pages the UE, that is, bearer B is not lost, thereby ensuring normal use of a service, and improving user experience.

Further, step 402 may specifically be, when the mobility management back-off timer of the user equipment is under the running state and the value of the TIN of the user equipment is the GUTI, the user equipment sends the RAU message.

The mobility management back-off timer being under the running state indicates that the user equipment does not actively send the RAU message.

Figure 9:
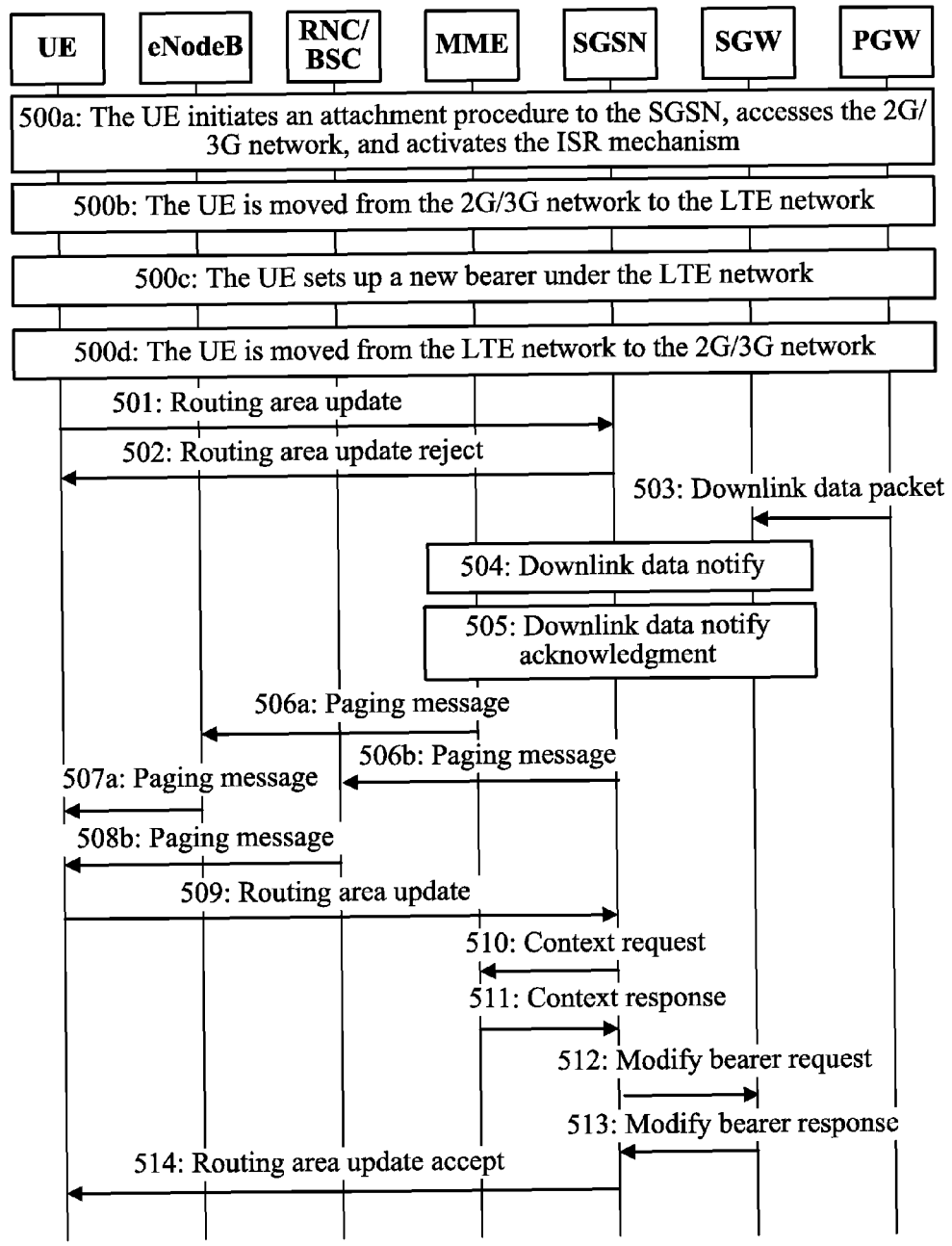
FIG. 9 is a schematic flow chart of a fifth method provided by an embodiment of the present invention.

In a specific scenario below, the method provided by the embodiment of the present invention is further illustrated with examples. As shown in FIG. 9, FIG. 9 describes a scenario in which the UE initially camps on the SGSN side and activates the ISR mechanism. In the scenario, the UE is moved from the 2G/3G network to the LTE network, and sets up a new bearer in the LTE network. Afterwards, the UE is returned from the LTE network to the 2G/3G network. When initiating a RAU procedure to the SGSN, the UE is rejected due to that the SGSN is overloaded, and the UE starts the mobility management back-off timer. During the running period of the timer, the UE cannot actively send a NAS message, but can accept a called-related service. When the UE receives paging sent by the SGSN, the UE sends the RAU message after determining that the value of the TIN inside the UE is the GUIT. After receiving the RAU message, the SGSN acquires the bearer context of the UE from the MME. The specific process is as follows.

500a: The UE initiates an attachment procedure to the SGSN, accesses the 2G/3G network, and activates the ISR mechanism; that is the UE is on the SGSN side.

500b: The UE is moved from the 2G/3G network to the LTE network; that is the UE is moved to the MME side.

500c: The UE sets up a new bearer under the LTE network, where the UE sets the TIN as the GUTI.

500d: The UE is moved from the LTE network to the 2G/3G network; that is the UE is moved to the SGSN side.

501: The UE sends a routing area update (RAU) message to the SGSN.

Because the UE sets up a new bearer under the MME, after the UE is moved to the SGSN side, the UE needs to send the RAU message to the MME, and the SGSN acquires the bearer context from the MME after receiving the RAU message.

502: Because the SGSN is overloaded, the SGSN sends a routing area update reject (RAU Reject) message to the UE.

The RAU Reject message includes the time of the mobility management back-off timer. After receiving the TAU Reject message including the time of the mobility management back-off timer sent by the MME, the UE starts the mobility management back-off timer of the UE, and in the condition that the timer does not expire, the UE does not actively send the NAS message (except serving a user, except emergency service and called-related service). In this case, inconsistency between the bearer context on the UE and the bearer context on the SGSN occurs.

503: After the PGW receives a downlink data packet sent to the UE, the PGW sends the downlink data packet to the SGW.

A person of ordinary skill in the art may understand that, other manners may also lead to that the network side initiates paging to the UE, for example, receiving a Create Bearer Request or receiving a modify bearer request.

504: The SGW sends a downlink data notify (DDN) message to each of the MME and the SGSN.

505: The MME and the SGSN each send a downlink data notify acknowledgment (DDN Ack) message to the SGW.

506a: The MME sends a paging message to the eNodeB.

506b: The SGSN sends a paging message to an RNC/BSC.

507a: The eNodeB sends the paging message to the UE.

508b: The RNC/BSC sends the paging message to the UE.

509: The UE sends a routing area update (RAU) message to the SGSN.

The UE is on the SGSN side at this time. After receiving the paging message sent by the RNC/BSC, the UE determines that the value of the TIN is the GUTI, and learns that the bearer context is changed on the MME side. Therefore, the UE sends the RAU message. After receiving the RAU message, the SGSN acquires the bearer context from the MME.

Optionally, the UE may also determine whether the mobility management back-off timer is under the running state at the same time. When the mobility management back-off timer is under the running state and the value of the TIN is the GUTI, the UE sends the RAU message.

510: The SGSN sends a context request (Context request) message to the MME.

511: The MME sends a context response (Context Response) message to the SGSN.

At this time, the SGSN acquires the bearer context from the MME. In this case, the bearer context on the UE and the bearer context on the SGSN keep consistent.

512: The SGSN sends a modify bearer request (Modify Bearer request) message to the SGW.

513: The SGW sends a modify bearer response (Modify Bearer Response) message to the SGSN.

At this time, a radio bearer between the UE and the RNC/BSC is set up. Because the bearer context on the UE and the bearer context on the SGSN are consistent, in this process, a case that a part of bearers are lost does not occur.

514: The SGSN sends a routing area update accept (RAU Accept) message to the UE.

After uplink and downlink channels get through, a downlink data packet can be sent from the SGW to the UE.

In the same way, if the paging is initiated according to a Create Bearer Request or a modify bearer request, after the RAU procedure ends and uplink and downlink channels (for example, a connection on a radio side) are set up, a Create Bearer Request procedure or a modify bearer request procedure is continued.

In this scenario, after receiving the paging sent by the SGSN, the UE learns, by determining that the value of the TIN of the UE is the GUTI, that the bearer context is changed on the MME side, and therefore, the UE sends the RAU message. After receiving the RAU message, the SGSN acquires the bearer context from the MME. Because the bearer context on the SGSN and the bearer context on the UE are consistent, in the paging process, a loss of a part of bears does not occur, thereby ensuring normal use of a service, and improving user experience.

Figure 10:
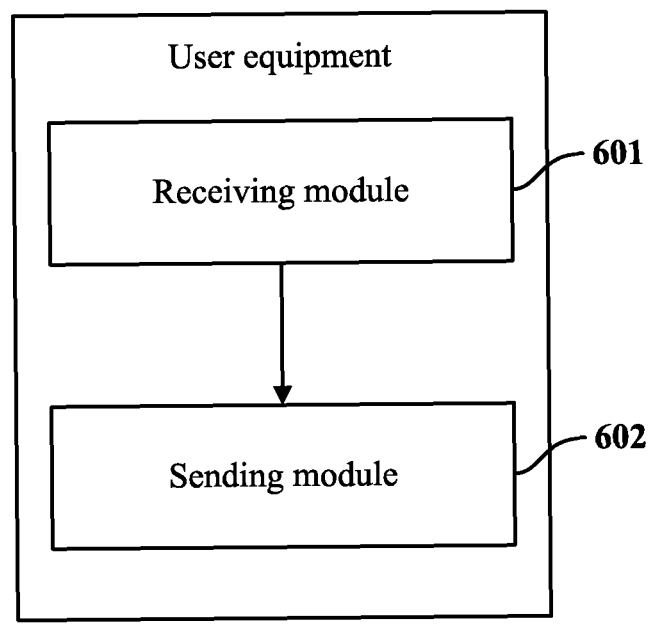
FIG. 10 is a schematic structural diagram of a device provided by an embodiment of the present invention.

The idea of the method provided by the embodiment of the present invention may also be applied to a user equipment, As shown in FIG. 10, an embodiment of the present invention further provides a user equipment, which includes a receiving module 601 and a sending module 602. The receiving module 601 is configured to receive a paging message sent by a mobility management network element. The sending module 602 is configured to: after the paging message sent by the mobility management network element is received, send a message for location update to the mobility management network element according to a value of a TIN, so that the mobility management network element acquires a bearer context of the user equipment.

After receiving the paging message sent by the mobility management network element, the user equipment provided by the embodiment of the present invention sends the message for location update to the mobility management network element according to the value of the TIN of the user equipment. After receiving the message for location update, the mobility management network element may acquire the bearer context of the user equipment.

Optionally, the receiving module 601 is specifically configured to receive a paging message sent by an MME; and the sending module 602 is specifically configured to, after the paging message sent by the MME is received and when a value of a TIN is a P-TMSI, send a TAU message to the MME, so that the MME acquires the bearer context of the user equipment from an SGSN.

Further, the sending module 602 is specifically configured to, after the paging message sent by the MME is received and when a mobility management back-off timer is under a running state and when the value of the TIN is the P-TMSI, send the TAU message to the MME.

After receiving the paging message sent by the MME and when the value of the TIN is the P-TMSI, the user equipment provided by the embodiment of the present invention sends the TAU message to the MME. After receiving the TAU message, the MME may acquire the bearer context of the user equipment.

Optionally, the receiving module 601 is specifically configured to receive the paging message sent by the SGSN; and the sending module 602 is specifically configured to: after the paging message sent by the SGSN is received and when the value of the TIN is a GUTI, send a RAU message to the SGSN, so that the SGSN acquires the bearer context of the user equipment from the MME.

Further, the sending module 602 is specifically configured to, after the paging message sent by the SGSN is received and when the mobility management back-off timer is under the running state and the value of the TIN is the GUTI, send the RAU message to the SGSN.

After receiving the paging message sent by the SGSN and when the value of the TIN is the GUTI, the user equipment provided by the embodiment of the present invention sends the RAU message to the SGSN. After receiving the RAU message, the SGSN may acquire the bearer context of the user equipment.

In sum, the user equipment provided by the embodiment of the present invention receives the paging message sent by a network side, sends the message for location update to the mobility management network element after determining the value of the TIN on the user equipment, and the mobility management network element acquires the bearer context of the user equipment after receiving the message for location update, the bearer context on the mobility management network element on the network side where the user equipment is located and the bearer context on the user equipment may keep consistent, thereby further overcoming a problem of a loss of a part of bearers in a paging process or setup of a bearer with inconsistent bearer contexts at two ends, ensuring normal use of a service, and improving user experience.

Figure 11:
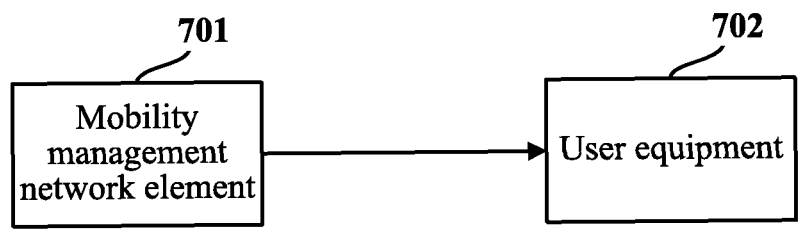
FIG. 11 is a schematic structural diagram of a system provided by an embodiment of the present invention.

The idea of the method provided by the embodiment of the present invention may also be applied to a system, As shown in FIG. 11, an embodiment of the present invention further provides a paging processing system, including: a mobility management network element 701 and a user equipment 702. The mobility management network element is configured to send a paging message to the user equipment, and after receiving a message for location update sent by the user equipment, acquire a bearer context of the user equipment. The user equipment is configured to receive the paging message sent by the mobility management network element, and send the message for location update to the mobility management network element according to a value of a TIN.

The mobility management network element may be an MME.

The MME is specifically configured to send the paging message to the user equipment, and after receiving a TAU message sent by the user equipment, acquire the bearer context of the user equipment from an SGSN.

The user equipment is specifically configured to receive the paging message sent by the MME, and when the value of the TIN is a P-TMSI, send the TAU message to the MME.

Further, the user equipment is specifically configured to receive the paging message sent by the MME, and when a mobility management back-off timer is under a running state and the value of the TIN is the P-TMSI, send the TAU message to the MME.

The mobility management network element may be an SGSN.

The SGSN is specifically configured to send the paging message to the user equipment, and after receiving a RAU message sent by the user equipment, acquire the bearer context of the user equipment from an MME.

The user equipment is specifically configured to receive the paging message sent by the SGSN, and when the value of the TIN is a GUTI, send the RAU message to the SGSN.

Further, the user equipment is specifically configured to receive the paging message sent by the SGSN, and when the mobility management back-off timer is under the running state and the value of the TIN is the GUTI, send the RAU message to the SGSN.

In the paging processing system provided by the embodiment of the present invention, after the paging message sent by a network side is received, the message for location update is sent after determining the value of the TIN on the user equipment, and the mobility management network element acquires the bearer context of the user equipment after receiving the message for location update, the bearer context on the mobility management network element on the network side where the user equipment is located and the bearer context on the user equipment may keep consistent, thereby further overcoming a problem of a loss of a part of bearers in a paging process or setup of a bearer with inconsistent bearer contexts at two ends, ensuring normal use of a service, and improving user experience.

It may be understood by a person of ordinary skill in the art that the accompanying drawings are merely schematic views of an embodiment, and modules or processes in the accompanying drawings are not necessarily required for implementing the present invention.

A person of ordinary skill in the art may understand that modules in the user equipment provided in the embodiment may be arranged in the user equipment in a distributed manner according to the description of the embodiment, or may be arranged in one or more user equipments which are different from those described in the embodiment. The modules in the above embodiment may be combined into one module, or may be further split into multiple sub-modules.

A person of ordinary skill in the art may understand that all or part of the steps of the methods in the embodiments may be implemented by a program instructing relevant hardware. The program may be stored in a computer readable storage medium. When the program is run, the above steps of the methods in the embodiments are performed. The storage medium may be any medium capable of storing program codes, such as ROM, RAM, magnetic disk, optical disk, or the like.

Finally, it should be noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the idea and scope of the technical solutions of the embodiments of the present invention.

What is claimed is:

1. A paging processing method, comprising:
  sending, by a user equipment, a first routing area update (RAU) message to a serving general packet radio system (GPRS) support node (SGSN);
  receiving, by the user equipment, a first RAU reject message from the SGSN; and
  starting, by the user equipment, a mobility management back-off timer of the user equipment;
  receiving, by the user equipment, a paging message from the SGSN; and
  sending, by the user equipment, a second RAU message to the SGSN in response to the paging message when a value of a temporary identity used in next update (TIN) of the user equipment is a globally unique temporary identity (GUTI) and the mobility management back-off timer of the user equipment is under a running state.

2. The method according to claim 1, wherein the first RAU reject message carries a value of the mobility management back-off timer.

3. The method according to claim 1, wherein an idle mode signaling reduction (ISR) mechanism is activated for the user equipment.

4. The method according to claim 1, wherein the first RAU reject message is sent because of an overload of the SGSN.

5. A user equipment, comprising:
  a transmitter, configured to send a first routing area update (RAU) message to a serving general packet radio system (GPRS) support node (SGSN);
  a receiver, configured to receive a first RAU reject message from the SGSN;
  a processor, configured to start a mobility management back-off timer of the user equipment;
  wherein the receiver is further configured to receive a paging message from the SGSN; and wherein the transmitter is further configured to, in response to the paging message, send a second RAU message to the SGSN when a value of a temporary identity used in next update (TIN) is a globally unique temporary identity (GUTI) and the mobility management back-off timer of the user equipment is under a running state.

6. The user equipment according to claim 5, wherein the first RAU reject message carries a value of the mobility management back-off timer.

7. The user equipment according to claim 5, wherein an idle mode signaling reduction (ISR) mechanism is activated for the user equipment.

8. The user equipment according to claim 5, wherein the first RAU reject message is sent because of an overload of the SGSN.

9. A paging processing system, comprising:
a serving general packet radio system (GPRS) support node (SGSN); and
a user equipment;
wherein the user equipment is configured to send a first routing area update (RAU) message to the SGSN, receive a first RAU reject message from the SGSN and start a mobility management back-off timer of the user equipment;
wherein the SGSN is configured to send a paging message to the user equipment, and after receiving a second RAU message from the user equipment, to acquire a bearer context of the user equipment; and
wherein the user equipment is further configured to receive the paging message sent by from the SGSN, and to send the second RAU message to the SGSN in response to the paging message when a value of a temporary identity used in a next update (TIN) of the user equipment is a globally unique temporary identity (GUTI) and the mobility management back-off timer of the user equipment is under a running state.

10. The paging processing system according to claim 9, wherein the first RAU reject message carries a value of the mobility management back-off timer.

11. The paging processing system according to claim 9, wherein an idle mode signaling reduction (ISR) mechanism is activated for the user equipment.

12. The paging processing system according to claim 9, wherein the first RAU reject message is sent because of an overload of the SGSN.

* * * * *

UNITED STATES PATENT AND TRADEMARK OFFICE
CERTIFICATE OF CORRECTION

| | |
|---|---|
| PATENT NO. | : 9,491,732 B2 |
| APPLICATION NO. | : 14/155942 |
| DATED | : November 8, 2016 |
| INVENTOR(S) | : Ningshen Wang |

Page 1 of 1

It is certified that error appears in the above-identified patent and that said Letters Patent is hereby corrected as shown below:

In the Claims

In Column 18, Line 6, Claim 9, delete "sent by".

Signed and Sealed this
Seventh Day of March, 2017

Michelle K. Lee
*Director of the United States Patent and Trademark Office*